3,410,695
PRODUCTS AND PROCESS FOR IMPROVING THE QUALITY OF SEASONINGS, FOODS AND BEVERAGES
Akio Shiga, Hideyuki Furukawa, and Akio Kanemitsu, Machida-shi, Japan, assignors to Kyowa Hakko Kogyo Co., Ltd., Tokyo, Japan, a corporation of Japan
No Drawing. Filed Oct. 26, 1964, Ser. No. 406,602
Claims priority, application Japan, Oct. 31, 1963, 38/57,662
20 Claims. (Cl. 99—140)

ABSTRACT OF THE DISCLOSURE

A flavor and taste enhancing agent for food and beverages comprising L-glutamic acid-L-lysine copolypeptide, L-glutamic acid-L-ornithine copolypeptide, or L-aspartic acid-L-lysine copolypeptide with the possible addition of flavorous 5'-nucleotide and sodium monoglutamate.

---

The present invention relates to the improvement of the quality of seasonings, foods and beverages, and is based on the novel observation that such improvement can be realized by the incorporation into the several enumerated materials or substrates of an organoleptically effective amount of copolypeptide. Typical copolypeptides which can be employed for this purpose, according to this invention, are inter alia L-glutamic acid–L-lysine copolypeptide, L-glutamic acid–L-ornithine copolypeptide, L-aspartic acid–L-lysine copolypeptide and the like. Not only does such incorporation enhance taste and flavor characteristics, as for example intensifying the natural taste and flavor of a food or beverage, but in some cases at least it has the effect of eliminating unfavorable taste and flavor characteristics. The net effect, in any event, is enhancement and improvement of taste and flavor qualities.

Monosodium L-glutamate has long been used as a flavor enhancer for foods and beverages. Recently, there has been a trend in this art to use mixed or combination seasonings; thus, monosodium L-glutamate has been used in combination or admixture with other taste and flavor enhancers such as certain of the 5'-nucleotides. The object has generally been to enhance and improve flavor without disturbing natural taste, even after cooking of the food or liquid being treated. Such combination seasonings have not been able to simulate natural taste, although they certainly have been an improvement over the previously used seasonings, such as monosodium L-glutamate alone.

As afore-indicated, according to the present invention the copolypeptides are used as agents which contribute significantly to the development of food and beverage flavor. According to a further aspect of the invention, a synergistic action is achieved by admixing a copolypeptide of the invention with a flavorous 5'-nucleotide and using the thus-obtained mixed or combination seasoning as a flavoring agent or seasoning for foods and beverages. In this way, an improvement is realized in the seasoning properties of the flavorous 5'-nucleotides.

The results achieved according to this invention are unexpected and surprising, particularly in view of the fact that many of the peptides which have been recovered from natural sources have a bitter or otherwise unacceptable taste. In sharp contrast, the copolypeptides employed according to the invention have the following characteristics:

(1) When used individually as sole seasoning additament, they impart a mild and pleasant taste to the thus-seasoned food or beverage.

(2) they do not bring about any unpleasant or undesired increase in viscosity, nor do they give rise to a usually unpleasant and undesired sensation of undue surface viscosity (quasi-gelatinous feeling) of the treated substrate.

(3) They exert a considerable buffering action, with consequent maximum retention of and minimum deterioration of the natural taste of the substrate, even during and/or after cooking.

(4) They exert a synergistic action with the flavorous 5-nucleotides, and consequently are advantageously employed in the preparation of mixed or combination chemical seasonings of the copolypeptide-5'-nucleotide type, which are superior to the mixed 5'-nucleotide-containing seasonings heretofore and currently employed, e.g., those of the monosodium glutamate-5'-nucleotide type.

An important advantage of the use of the copolypeptides according to the present invention is that no prejudicial action whatever on food is encountered during such use, even when the copolypeptides are present during cooking (where the food requires cooking before being eaten or the beverage is similarly taken hot). This advantage is due to the superior heat-stability of the said copolypeptides.

A further favorable characteristic of the copolypeptides is their hygroscopic character which operates in favor of proper retention of water (moisture) in cooked foods seasoned therewith, whereby prejudicial drying-out is effectively avoided. Moreover, unfavorable effects in the preparation of mixed seasonings therewith or in the dissemination thereof, e.g. from shaker type receptacles, are avoided, due to their anti-electrostatic character.

The copolypeptides useful according to this invention can be of the monoaminodicarboxylic acid-monoaminodicarboxylic acid copolypeptide type wherein both amino acid residues are identical as well as wherein both amino acid residues are different (e.g., the glutamic acid-aspartic acid copolypeptides) and they can also be of the diaminodicarboxylic acid-diaminodicarboxylic acid type, again with the same or different amino acid residues, (e.g. the ornithine-lysine copolypeptides), or they can be made up of more than two identical or different amino acid residues. The copolypeptides are generally soluble in aqueous solutions and any of these can be employed, regardless of the magnitude of the molecular weight thereof, although it will generally be impractical to use copolypeptides of such large molecular weight that they do not dissolve in water.

The copolypeptides per se are known and, as such, do not constitute the present invention and no claim is made thereto. The invention is concerned with the use thereof in the food flavoring art and in appurtenant compositions, all as hereinafter claimed.

The following illustrative, but nonlimitative, examples represent presently preferred embodiments of the invention. Parts are by weight unless otherwise indicated. Percentages are by weight.

Example 1

Monosodium L-glutamate (90 parts by weight) and sodium 5'-inosinate (4 parts by weight) are intimately combined with 6 parts by weight of L-glutamic acid–L-lysine copolypeptide (mole ratio 50:50; molecular weight determined by osmotic pressure method: about 3,000). When this mixed seasoning is subjected to organoleptic testing, it is found to be equivalent to that seasoning which consists of 94 parts by weight of monosodium L-glutamate and 6 parts by weight of sodium 5'-inosinate. Moreover, the new mixture according to the present example results in a significant improvement in the taste of any substrate (food or beverage such for example as tomato juice) into which it is incorporated.

Example 2

L-glutamic acid–L-lysine copolypeptide (mole ratio 50:50; molecular weight determined by osmotic pressure method: about 1,000) is added homogeneously to purely synthetic "sake" (Japanese alcoholic beverage from rice) in a concentration of 0.05 to 0.5%. The thus-obtained beverage has a taste like that of, but richer than, the original "sake." A similar incorporation into natural "sake" (Seishu) produces a similar enhancement. While the "sake" taste is sometimes similarly improved with known seasonings, the copolypetptide seasoning of this example differs in that it also eliminates the astringency and irritative property which are characteristic of some "sake" beverages.

Example 3

L-aspartic acid–L-lysine copolypeptide (mole ratio 50:50; molecular weight determined by osmotic pressure method: about 3,000) is homogeneously incorporated into peanut butter at a concentration of 0.1 to 0.5%. The peanut buttery flavor is significantly improved and intensified; moreover, the peanut butter thus treated withstands storage at 37° C. for 3 months with no sign of rancidity.

Example 4

0.2 part by weight of L-glutamic acid–L-ornithine copolypeptide (mole ratio 50:50; molecular weight determined by osmotic pressure method: about 800) is intimately admixed with 0.04 part by weight of sodium 5'-guanylate. The resultant seasoning has a taste equivalent to that of a solution of 2 parts by weight of the said copolypeptide in 100 parts by volume of water (in this and other examples, part by weight:part by volume =gram:milliliter).

The mixed seasoning of this example has a pleasant sensation and taste in the mouth, as contrasted, e.g., to that given by monosodium glutamate alone.

The new seasoning is useful for instance for enhancing the natural taste of tang sea weed (Konbu) soup.

Example 5

0.4 part by weight of L-aspartic acid–L-lysine copolypeptide (mole ratio 50:50; molecular weight determined by osmotic pressure method: about 32,000), 0.04 part by weight of sodium 5'-inosinate and 4 parts by weight of monosodium glutamate are dissolved in 2,000 parts by volume of water.

The thus-obtained solution is substantially equivalent in taste magnitude to that of a solution of 0.04 part by weight of sodium 5'-inosinate and 5 parts by weight of sodium glutamate in 2,000 parts by volume of water. However, the first-mentioned solution is markedly superior to the latter in the absence of "viscous feeling."

Example 6

3 parts by weight of L-glutamic acid–L-lysine copolypeptide (mole ratio 60:40; molecular weight determined by osmotic pressure method: about 40,000) is thoroughly admixed with 100 parts by weight of still liquid fruit jelly and 10 parts by weight of sugar, with sufficient heating to maintain ready stirrability. The semisolid material obtained upon cooling to ambient temperature was cut into block form to prepare glutinous type candy ("jellies") of nice quality.

The candy thus obtained has a better taste than that obtained when using egg yolk in place of copolypeptide.

Example 7

So-called "hot cake" mix, prepared from 400 parts by weight of wheat flour, 2 parts by weight of baking powder, 45 parts by weight of sugar, 60 parts by weight of butter and 450 parts by volume of milk, has thoroughly incorporated thereinto 1 part by weight of L-aspartic acid-L-lysine copolypeptide (mole ratio 60:40; molecular weight determined by smotic pressure; about 35,000). Hot cakes prepared from this mixture have at least the same and generally a better taste than hot cakes prepared from the same mix but employing two eggs instead of each part by weight of cploypeptide; moreover, the hot cakes prepared according to the invention retain their moisture better than do those made with eggs.

Example 8

100 parts by weight of wheat flour, 100 parts by weight of butter and 120 parts by weight of sugar, with addition of 8 to 10 drops of lemon essence for each 320 grams of mixture, are thoroughly admixed with 10 parts by weight of the same copolypeptide as that used in Example 6 and with 5 parts by weight of the same copolypeptide as that used in Example 7.

The so-obtained mixture is kept at ambient temperature for several minutes and is then baked in the oven for 30 minutes at 182°–187° C. The resultant pastry-confection ("Kastera") is superior in its moisture-retention capacity to Kastera prepared with eggs in lieu of the copolypeptides.

Example 9

L-asparatic acid–L-lysine copolypeptide (molecular weights of constituents ranging between 500 and 6,000 when measured by the osmotic pressure method) is incorporated into beer at some stage (saccharification, fermentation or filtration) in the course of the production thereof in such amount that the concentration in the final product is from 0.2 to 0.01%. Beer thus modified is of improved quality in that it has a milder taste than the corresponding unimproved beer, gives a better sensation during drinking, and prolongs the period of retention of foam.

The unimproved beer deteriorates upon storage at 37° C. for 3 months, with exposure to sunlight, and gives off a characteristic disagreeable odor. Under similar conditions, the beer improved according to this example, is free of such odor.

Example 10

Beer, as conventionally prepared, tends to deteriorate when stored at 37° C. for 3 months with intermittent exposure to sunlight, the quality, odor and taste of the beer being impaired.

The incorporation into such beer of L-glutamic acid–L-lysine copolypeptide (molecular weight ranging from about 500 to 6,000 when measured by the osmotic pressure method) in an amount that the final concentration of copolypeptide is 0.2 to 0.01%, significantly improves the beer, with substantial elimination of disagreeable odor and/or taste.

Example 11

Synthetic flavoring has been added to synthetic "sake" for the purpose of improving the flavor thereof.

Improved results are obtained according to the present invention if the synthetic flavoring is preliminarily admixed with L-aspartic acid–L-lysine copolypeptide (such as that used in Example 9), using a comparatively high concentration of the copolypeptide (for instance 10 to 30%). The thus-treated synthetic flavoring is then incorporated into the beverage. The latter will be found to be superior in flavor in comparison with "sake" flavored without using the copolypeptide.

Copolypeptides, as hereinbefore mentioned, are known. The terminology is somewhat analogous to that used in the polymer art. There, a polymer is produced by polymerization of a monomer, and a copolymer is produced by simultaneous polymerization (copolymerization) of two or more monomers. In the instant situation, an amino acid can be converted to a polypeptide by appropriate treatment (condensation or the like); simultaneous conversion of a plurality of amino acids yields copolypeptide. Just as the expression "vinyl chloride-vinyl acetate copolymer" indicates the product of the simultaneous polymerization of vinyl chloride and vinyl acetate, the expression e.g. "L-aspartic acid–L-lysine copolypeptide" signifies the product resulting from simultaneous polypeptide formation from L-aspartic acid and L-lysine. Since in many cases there is random arrangement of the several amino acid residues, it may perhaps be more appropriate to use the "L-aspartic acid, L-lysine copolypeptide" type of terminology. The formula of a simple copolypeptide would be representable as follows:

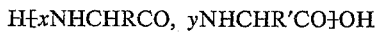

The $x$ and $y$ magnitudes are variable and the whole is determined by molecular weight and by other means used in the art (biuret reaction, viscosity, osmotic pressure, light scattering, etc.). See in this regard the following references.

Polyamino acids, peptides, and proteins:
    Proceedings of an International Symposium held at the University of Wisconsin, 1961, edited by Mark A. Stahman.
    The University of Wisconsin Press, Madison, 1962, Paper 36 on pp. 379–385, entitled, "Biological Studies With Copolypeptides of L-Glutamic Acid and L-Lysine," E. R. Blout, S. Farber, G. D. Fasenan, E. Klein and M. Narrod.

What is claimed is:

1. A flavor and taste enhancing agent for food and beverages consisting of a synergistic mixture of copolypeptide selected from the group consisting of L-glutamic acid–L-lysine copolypeptide, L-glutamic acid–L-ornithine copolypeptide and L-aspartic acid–L-lysine copolypeptide and flavorous 5'-nucleotide.

2. The flavor and taste enhancing agent of claim 1, wherein said 5'-nucleotide is selected from the group consisting of sodium 5'-inosinate and sodium 5'-guanylate.

3. The flavor and taste enhancing agent of claim 2, further including sodium monoglutamate.

4. A flavor and taste enhancing agent for food and beverages consisting of a synergistic mixture of copolypeptide selected from the group consisting of L-glutamic acid–L-lysine copolypeptide, L-glutamic acid–L-ornithine copolypeptide and L-aspartic acid–L-lysine copolypeptide and sodium monoglutamate.

5. A flavor and taste enhancing agent for food and beverages consisting of a synergistic mixture of copolypeptide selected from the group consisting of L-glutamic acid–L-lysine copolypeptide, L-glutamic acid–L-orithine copolypeptide and L-aspartic acid–L-lysine copolypeptide, flavorous 5'-nucleotide and sodium monoglutamate.

6. Food containing in intimate admixture therein a proportion of copolypeptide selected from the group consisting of L-glutamic acid–L-lysine copolypeptide, L-glutamic acid–L-ornithine copolypeptide and L-aspartic acid–L-lysine copolypeptide effective to enhance taste and flavor.

7. Food containing in intimate admixture therein a proportion of an L-glutamic acid–L-lysine copolypeptide effective to enhance taste and flavor.

8. Food containing in intimate admixture therein a proportion of an L-aspartic acid–L-lysine copolypeptide effective to enhance taste and flavor.

9. Food containing in intimate admixture therein a proportion of an L-glutamic acid–L-ornithine copolypeptide effective to enhance taste and flavor.

10. A beverage containing in intimate admixture therein a proportion of copolypeptide selected from the group consisting of L-glutamic acid–L-lysine copolypeptide, L-glutamic acid–L-ornithine copolypeptide and L-aspartic acid–L-lysine copolypeptide effective to enhance taste and flavor.

11. A method of enhancing the flavor and taste of food and beverages which comprises incorporating therein an effective amount of a copolypeptide selected from the group consisting of L-glutamic acid–L-lysine copolypeptide, L-glutamic acid–L-ornithine copolypeptide and L-aspartic acid–L-lysine copolypeptide.

12. The method of claim 11, wherein said copolypeptide is employed in an amount of from about 0.01 to 30% by weight.

13. A method of enhancing the flavor and taste of food and beverages which comprises incorporating therein an effective amount of a synergistic mixture of a copolypeptide selected from the group consisting of L-glutamic acid–L-lysine copolypeptide, L-glutamic acid–L-ornithine copolypeptide and L-aspartic acid–L-lysine copolypeptide and a flavorous 5'-nucleotide.

14. The method of claim 13, wherein said 5'-nucleotide is selected from the group consisting of sodium 5'-inosinate and sodium 5'-guanylate.

15. The method of claim 14, wherein sodium monoglutamate is also incorporated in the food or beverage.

16. A method of enhancing the flavor and taste of food and beverages which comprises incorporating therein an effective amount of a synergistic mixture of a copolypeptide selected from the group consisting of L-glutamic acid–L-lysine copolypeptide, L-glutamic acid–L-ornithine copolypeptide and L-aspartic acid–L-lysine copolypeptide and sodium monoglutamate.

17. A method of enhancing the flavor and taste of food and beverages which comprises incorporating therein an effective amount of a synergistic mixture of a copolypeptide selected from the group consisting of L-glutamic acid–L-lysine copolypeptide, L-glutamic acid–L-ornithine copolypeptide and L-aspartic acid–L-lysine copolypeptide a flavorous 5'-nucleotide and sodium monoglutamate.

18. A method of enhancing the flavor and taste of food and beverages which comprises incorporating therein an effective amount of an L-glutamic acid–L-lysine copolypeptide.

19. A method of enhancing the flavor and taste of food and beverages which comprises incorporating therein an effective amount of an L-aspartic acid–L-lysine copolypeptide.

20. A method of enhancing the flavor and taste of food and beverages which comprises incorporating therein an effective amount of an L-glutamic acid–L-ornithine copolypeptide.

References Cited

UNITED STATES PATENTS 2,414,299   1/1947   Hall _____ 99—16
3,104,171   9/1963   Sakaguchi et al. _____ 99—140

A. LOUIS MONACELL, *Primary Examiner.*

H. H. KLARE III, *Assistant Examiner.*